3,280,173
PRODUCTION OF ESTERS FROM ALDEHYDES AND ALCOHOLS IN THE PRESENCE OF CHLORINE
William F. Brill, Skillman, and Robert W. Etherington, Jr., Pennington, N.J., assignors to Petro-Tex Chemical Corporation, Houston, Tex., a corporation of Delaware
No Drawing. Filed July 10, 1962, Ser. No. 208,914
8 Claims. (Cl. 260—475)

This invention relates to a process for the preparation of organic esters and relates more particularly to the preparation of esters by the reaction of carbonyl compounds and hydroxy compounds in the presence of halogens.

It is an object of this invention to provide a useful and improved process for the preparation of organic esters which avoids many of the disadvantages of present commercial processes and to provide a process having broad commercial applications. It is further the object of this invention to provide an economical process capable of producing high yields of high purity esters. Other objects of this invention will be apparent from the disclosure which follows.

It has been found that these objects may be attained by reacitng in liquid phase a compound containing a carbonyl group with a compound containing a hydroxyl group at a pH of less than 5 in the presence of elemental halogen. For example, the reaction of benzaldehyde with methyl alcohol in the presence of a halogen, such as chlorine, will produce methyl benzoate.

The process of this invention may be effected either as a batchwise or continuous operation. If a batchwise process is employed, the carbonyl compound, hydroxy compound and halogen may be added simultaneously or individually to the reactor. It is generally prefered to add the halogen separately to a mixture of hydroxy compound and carbonyl compound. The halogen may be introduced as a gas or as a liquid solution into the reaction zone from single or multiple injection inlets. Injection inlets of the nozzle or atomizer variety are useful in accomplishing this purpose. It is generally preferred to operate with multiple gas injection inlets, thus, eliminating halogen concentration buildups in the reaction mixture.

If a continuous process is employed, the halogen will preferably be sufficiently mixed with the hydroxy compound and carbonyl compound prior to the introduction of the reactants into the reaction zone. The reaction mixture leaving the reactor is then treated to recover the esters and any unreacted hydroxy compound or carbonyl compound may be recycled to the reactor. The addition of any of the reactants may be either in the same direction as any of the other reactants or the reactants may be added countercurrent to each other.

One of the essential features of the process of this invention is that a pH reading of less than 5 must be maintained in the reaction zone. Generally a pH reading of less than 3, or more particularly, a pH reading of less than 2, such as between 2 and 1 is preferred. The effect of pH is important not only in the production of esters, but also in the production of specific types of esters. For example, the reaction of an aldehyde with a dihydroxy or polyhydroxy compound, such as ethylene glycol, in the presence of a halogen at an elevated temperature will produce either a hydroxy or a halo ester. The selectivity to either the hydroxy or the halo ester is determined somewhat by the pH in the reaction zone. At a pH reading of between 1 and 2 the production of hydroxy esters is substantially quantitative. When the pH reading is lowered below one, preferably to a point where the mixture has a pH reading of between 1.0 and 0.1, the production of halo esters becomes quantitative.

Molar ratios of hydroxy compound to carbonyl compound of about 0.1:1 to 100:1 may be used but molar ratios of hydroxy compound to carbonyl compound of about 0.5:1 to 20:1 are preferred. High efficiencies are obtained with about equal mols of the hydroxy compound and the carbonyl compound. The molar ratio of halogen to carbonyl compound may also be varied over a wide range. Generally, molar ratios of halogen to carbonyl compound of about 0.1:1 to 100:1 may be used but molar ratios of halogen to carbonyl compound of about 0.5:1 are preferred.

The rate of halogen input may be varied over a wide range. It is generally preferred to add halogen to the reactants at a rate equal to or slightly less than its rate of consumption, thus, eliminating the need of venting and recovering the unused halogen. The rate of addition and amount of halogen best suited for the production of esters will be dependent upon variables such as the particular hydroxy and carbonyl compounds reacted and the conditions employed.

Diluents or solvents may be included in the reaction mixture. Substantially inert or inert diluents or solvents such as benzene may be utilized although the halogenated compounds are sometimes more desirable. For example, if chlorine is the halogen reactant, a chlorinated benzene could be utilized. Examples of useful solvents are benzene, trichlorobenzene, carbon tetrachloride, benzotrichloride, and the like. Generally the solvent or diluent may be used in an amount of about 1 to 100 parts by volume of solvent or diluent per volume parts of the combined volume of hydroxy and carbonyl compounds. The use of a solvent or diluent aids in controlling the rate of reaction by dissipating the heat generated in the reaction. The use of a solvent or an excess of the hydroxy compound permits an increase in reaction temperature or an increase in the halogen input without sacrificing high ester yield and selectivity. If an excess of hydroxy compound is used, instead of using an inert solvent, a mol ratio of hydroxy compound to carbonyl compound of 2:1 to 100:1 may be used but a mol ratio of hydroxy compound to carbonyl compound of 5:1 to 20:1 is generally preferred. The use of a solvent in combination with a mol excess of hydroxy compound has also given excellent results in producing esters by the process of this invention. In addition to the inert or substantially inert solvents or diluents, an excess of either the carbonyl or hydroxy compound may act as a solvent or diluent. The use of a molar excess of the hydroxy compound based on the carbonyl compound functions as an excellent solvent.

The esterification process is generally conducted in the liquid phase and the pressure may be subatmospheric, atmospheric or superatmospheric pressure. However, the reaction is generally conducted at about atmospheric pressures or at pressures equal to the total pressures of the reactants at operating temperatures, with pressures such as from 10 p.s.i.a. to 1000 p.s.i.a. being suitable. Preferably the reaction is carried out between about 12 p.s.i.a. to 100 p.s.i.a. The reaction may be conducted at temperatures between about −30° C. to 300° C. although a temperature range between about 20° C. to 200° C. is preferred. Higher temperatures are generally employed, when aromatic carbonyl compounds are used while lower temperatures are generally used when an aliphatic carbonyl compound is used.

The carbonyl and hydroxy compounds generally applicable to the operation of this invention consist of compounds containing from about 1 to 25 carbon atoms each, although carbonyl and hydroxy compounds containing 1 to 15 carbon atoms each are usually preferred. The hydroxy or carbonyl compounds may be saturated or unsaturated. Excellent results have been obtained in reacting an aromatic carbonyl compound containing from about 7 to 15 carbon atoms with a hydroxy compound containing from about 1 to 4 carbon atoms.

Carbonyl compounds capable of reacting with hydroxy compounds and halogens to produce esters include the following groups of carbonyl compounds: carbocyclic aldehydes such as cyclopentylaldehyde; unsubstituted saturated aliphatic aldehydes such as acetaldehyde; unsubstituted aromatic aldehydes such as benzaldehyde and naphthaldehyde; heterocyclic aldehydes such as furfural, β-furylacrolein, and 2-thiophenealdehyde; aliphatic dialdehydes such as glyoxal; aromatic dialdehydes such as terephthalaldehyde; ethylenically unsaturated aliphatic aldehydes such as acrolein and crotonaldehyde; halogen substituted aliphatic aldehydes such as trichloropropionaldehyde and α-bromoheptaldehyde; substiuted benzaldehydes such as chlorobenzaldehyde, methoxybenzaldehyde, phenoxyacetaldehyde, o-tolualdehyde, 2,4,6-trimethylbenzaldehyde, and the like.

Hydroxy compounds capable of interacting with carbonyl compounds and halogens to produce esters include the following groups of hydroxy compounds: unsubstituted saturated aliphatic mono and dihydroxy compounds such as methanol, isopropanol, ethylene glycol and 1,5-pentanediol; carbocyclic hydroxy compounds such as cyclobutanol and cyclopentenol; aromatic alcohols such as benzyl alcohol; substituted phenols such as xylenol, cresol and catechol; heterocyclic alcohols such as tetrahydrofurfuryl alcohol and 4-hydroxyquinoline; aliphatic ethylenically unsaturated alcohols such as allyl alcohol; aromatic ethylenically unsaturated phenols such as allylphenol and phenylethynylcarbinol; aliphatic halogen substituted alcohols such as ethylene chlorohydrin and 2-chloro-1-propanol; aromatic halogen substituted alcohols such as p-cholorbenzyl alcohol and the like.

Esters of either mono or polycarboxylic acids may be produced according to this invention. Examples of esters that may be produced are such as ethyl acetate, t-butyl isobutyrate, cyclohexyl acetate, ethyl β-cyclohexylpropionate, methyl benzoate, α-naphthyl acetate, 1 or 4-acetoxyphenanthrene, methyl furoate, furfuryl acetate, diethyl oxalate, dimethyl phenylmalonate, methyl methacrylate, phenyl acrylate and the like. This invention may be further employed in the production of substituted monocarboxylic and polycarboxylic esters such as methyl trichloroacetate, ethyl α-bromo-β-isopropylacrylate, phenyl chloroformate, chloromethyl benzoate, ethyl m-(chloromethyl)-benzoate, propyl p-bromobenzoate, methyl lactate, ethyl β-hydroxybutyrate, ethyl 2-hydroxycyclohexanecarboxylate, ethyl ethoxyacetate, ethyl p-hydroxybenzoate, o-methoxyphenyl formate, β-carbomethoxypropionaldehyde, ethyl pyruvate, diethyl oxomalonate, methyl p-acetylbenzoate, benzoin acetate, dimethyl terephthalate, bis(chloroethyl) terephthalate, p-formyl benzoate, methyl hydrogen phthalate, and the like.

The halogens employed in the operation of this invention are chlorine, bromine, iodine, fluorine and mixtures thereof. In the production of aromatic esters such as the benzoates, naphthalates, toluates and the like, chlorine is generally preferred. In the production of the aliphatic esters such as the acetates, acrylates, methacrylates and the like, good results were obtained with bromine as the halogen.

The following examples are only illustrative of the manner in which the process of the invention may be carried out and the products obtained from its application. In the examples to follow, the pH determinations were made on a Beckman Glass Electrode pH meter which was standardized with an aqueous Beckman Buffer Solution (350) at 25° C.

*Example 1*

106 grams of benzaldehyde was dissolved in 620 grams of ethylene glycol and transferred to a one liter glass resin kettle equipped with an electric stirrer, thermometer, and a water cooled reflux condenser. The chlorine was introduced through a dip tube located below the surface of the liquid at a rate of 1 g./min. for 80 minutes. A pH reading of about 0.5 was maintained during the reaction. As the chlorine was introduced, the temperature increased to 87° C. due to the heat of reaction. The mixture was allowed to cool and the contents of the resin kettle analyzed. It was found that 98 mol percent of the benzaldehyde was converted to esters of which 69 mol percent was identified as 2-chloroethyl benzoate and 29 mol percent as hydroxy ethyl benzoate.

*Example 2*

Example 1 was repeated with the exception that HCl was added to maintain the pH of the reaction at 0.1. The temperature in this instance rose to 95° C. When the contents were cooled and analyzed, it was found to contain substantially pure 2-chloroethyl benzoate. Example 1 was repeated with the exception that the pH of the reaction was maintained between 1 and 2 by the addition of potassium carbonate. Under these conditions, 90 mol percent of the benzaldehyde was converted to hydroxy ethyl benzoate.

*Example 3*

To a mixture of 25.4 grams of benzaldehyde and 54.6 grams of methyl alcohol, 31.5 grams of chlorine was added at a rate of 1.05 gram/min. in the manner described in Example 1. The reaction was run at a temperature of 30° C. and a pH of between 1 and 2. The results showed a conversion of 90.9 mol percent to methyl benzoate. When the run was repeated at a temperature of 50° C., the results showed a substantially quantitative yield of methyl benzoate.

*Example 4*

To a mixture of approximately 30 grams of benzaldehyde and 110 grams of ethyl alcohol, 32 grams of chlorine was added at a rate of 1.05 grams/min. in the manner described in Example 1. The reaction was operated at a temperature of 40° C. and at a pH of between 1 and 2 which was maintained by the addition of potassium carbonate. The results showed that 65 mol percent of the benzaldehyde was converted to ethyl benzoate.

The run was repeated by replacing the ethyl alcohol with 220 grams of isopropyl alcohol. The results showed that 76 mol percent of the benzaldehyde was converted to isopropyl benzoate.

*Example 5*

To a mixture of 50 grams of terephthalalde and 500 grams of ethylene glycol, 79 grams of chlorine was added to a glass resin kettle as described in Example 1 at a rate of 1.05 grams/min. The temperature of reaction was maintined at 85° C. while the pH of the reactants was maintained at a pH below one, by the addition of HCl. The precipitated product was filtered, weighed and analyzed. A yield of 89 percent bis(chloroethyl) terephthalate was obtained.

*Example 6*

Example 5 was repeated with the exception that the pH of the reaction was maintained between 1 and 2 by the addition of potassium carbonate. A 45 mol percent yield of bis(hydroxyethyl)terephthalate (M.P. 110–111° C.) was obtained. The remaining 55 mol percent consisted primarily of unreacted aldehyde.

*Example 7*

A mixture of 25 grams of terephthalaldehyde and 50 grams of methyl alcohol was placed in a reactor described in Example 1. To this mixture was added 35 grams of chlorine at a rate of about 1 gram/min. The temperature of the above mixture was maintained at about 25° C. during the reaction period. A 38.7 mol percent yield of dimethyl terephthalate and a 49.0 mol percent yield of p-formyl benzoate was obtained.

*Example 8*

In a reactor, as described in Example 1, 70 grams of methacrolein was dissolved in 90 grams of methyl alcohol at a temperature maintained below 30° C. and at a pH reading of less than 2. Chlorine was added to the reactants at a rate of ½ gram per minute for 70 minutes. Substantially all of the methacrolein reacted and a yield of methyl methacrylate was obtained.

*Example 9*

When run 8 was repeated with bromine being used as the halogen instead of chlorine, a high yield of methyl methacrylate was obtained.

The esters produced may be used as solvents, plasticizers, as monomers, and for other known uses for esters.

We claim:

1. A process for preparing aromatic esters which comprises reacting in liquid phase at a pH of less than 2 methyl alcohol with an aromatic aldehyde selected from the group consisting of benzaldehyde, terephthalaldehyde and tolualdehyde with gaseous chlorine at a temperature between about 20° C. and 200° C. wherein the molar ratio of methyl alcohol to aromatic aldehyde is between about 0.5:1 to 20:1 and the molar ratio of chlorine to aromatic aldehyde is between 0.5:1 to 5:1.

2. A process for preparing aromatic chloro esters which comprises reacting in liquid phase at a pH of between 1.0 and 0.1 ethylene glycol with an aromatic aldehyde selected from the group consisting of benzaldehyde, terephthalaldehyde, and tolualdehyde with gaseous chlorine at a temperature between about 20° C. and 200° C.

3. A process for preparing aromatic chloro esters which comprises reacting in liquid phase at a pH of between 1.0 and 0.1 ethylene glycol with an aromatic aldehyde selected from the group consisting of benzaldehyde, terephthalaldehyde, and tolualdehyde with gaseous chlorine at a temperature betwe nabout 20° C. and 200° C. wherein the molar ratio of ethylene glycol to aromatic aldehyde is between 0.5:1 and 20:1 and the molar ratio of chlorine to aromatic aldehyde is between 0.5:1 to 5:1.

4. A process for preparing aromatic hydroxy esters which comprises reacting in liquid phase at a pH of between 2.0 and 1.0 ethylene glycol with an aromatic aldehyde selected from the group consisting of benzaldehyde, terephthalaldehyde, and tolualdehyde with gaseous chlorine at a temperature between about 20° C. and 200° C. wherein the molar ratio of ethylene glycol to aromatic aldehyde is between 0.5:1 and 20:1 and the molar ratio of chlorine to aromatic aldehyde is between 0.5:1 to 5:1.

5. A process for preparing aliphatic acid esters which comprises reacting in liquid phase at a pH of less than 2 a mixture of an aliphatic aldehyde with a hydroxy compound and chlorine at a temperature between about 20° C. and 200° C., wherein the molar ratio of hydroxy compound to aliphatic aldehyde is between about 0.5:1 to 20:1 and the molar ratio of chlorine to aliphatic aldehyde is between 0.5:1 and 5:1.

6. A process for preparing bis(hydroxyethyl)terephthalate which compriss reacting terephthalaldehyde and ethylene glycol in liquid phase with gaseous chlorine at a pH of between 2.0 and 1.0 at a temperature between about 20° C. and 200° C. wherein the molar ratio of ethylene glycol to terephthalaldehyde is between 0.5:1 and 20:1 and the molar ratio of chlorine to terephthalaldehyde is between 0.5:1 to 5:1.

7. A process for the production of bis(chloroethyl)terephthalate which comprises reacting terephthalaldehyde and ethylene glycol in liquid phase with gaseous chlorine at a pH of between 1.0 and 0.1 at a temperature between about 20° C. and 200° C. wherein the molar ratio of ethylene glycol to terephthalaldehyde is between 0.5:1 and 20:1 and the molar ratio of chlorine to terephthalaldehyde is between 0.5:1 and 5:1.

8. A process for preparing methyl methacrylate which comprises reacting methacrolein and methyl alcohol with chlorine in liquid phase at a pH of less than 5 and at a temperature between about −30° C. and 300° C.

References Cited by the Examiner

FOREIGN PATENTS 1,039,053   9/1958   Germany.

OTHER REFERENCES

Bogert et al.: J. Am. Chem. Soc., vol. 46, pp. 763–768, 1924.

LORRAINE A. WEINBERGER, *Primary Examiner.*

LEON ZITVER, *Examiner.*

R. E. MASSA, T. L. GALLOWAY,
*Assistant Examiners.*